Dec. 21, 1965  C. W. MacMILLAN  3,224,102
RATIO INDICATOR
Filed July 30, 1963  2 Sheets-Sheet 1
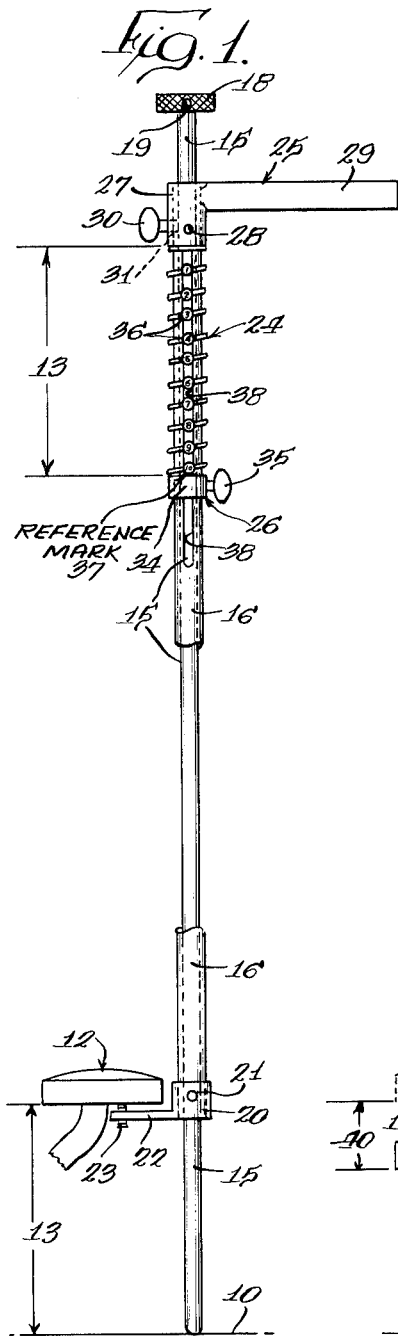
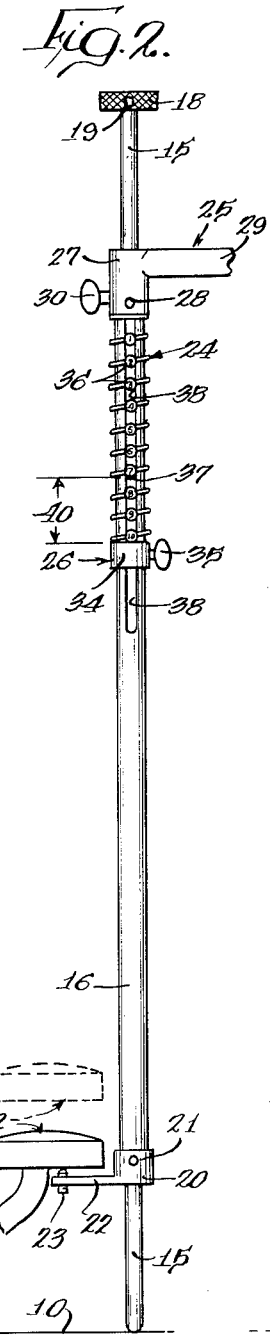
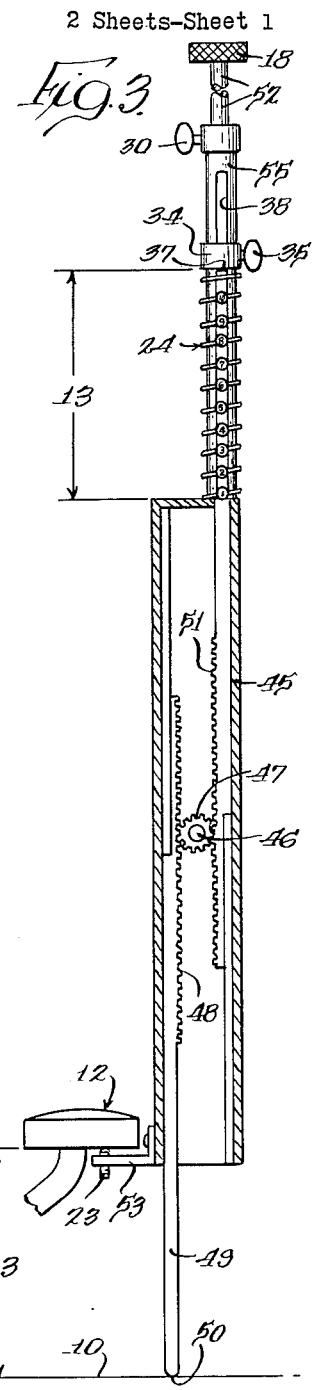
INVENTOR.
Charles W. MacMillan
BY
Gary, Parker, Juettner & Cullinan
Att'ys

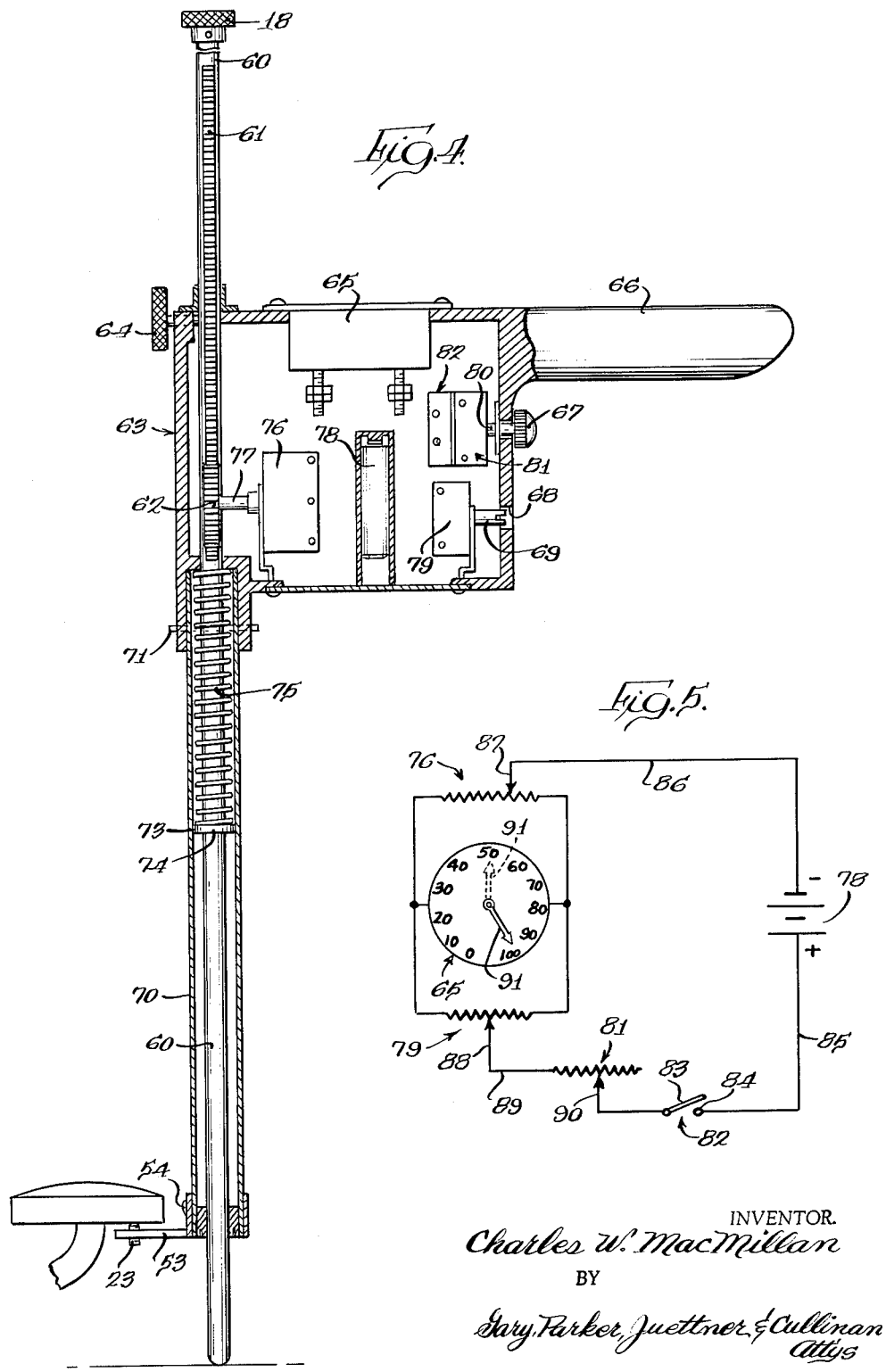

United States Patent Office 3,224,102
Patented Dec. 21, 1965

3,224,102
RATIO INDICATOR
Charles W. MacMillan, Rock Island, Ill., assignor to Bear Manufacturing Company, Rock Island, Ill., a corporation of Delaware
Filed July 30, 1963, Ser. No. 298,701
10 Claims. (Cl. 33—169)

This invention is directed to a ratio indicator for visually depicting the ratio between an operating value and a reference value, and more particularly to such an indicating system in which a reference value is established between the starting or normal locations of first and second elements, the elements are displaced relative to each other, and the operating value is determined as the percentage the extent of relative movement bears to the reference value.

The present invention finds utility in any arrangement where it is desired to know the ratio of an operating value or parameter with respect to some predetermined reference value. To facilitate an understanding of the invention, it will be described in connection with a system for depicting in relation to the amount of clearance initially or normally present between an automobile brake pedal and the floor of the automobile, the amount of movement resulting from, or the amount of clearance remaining after, an operator has depressed the brake pedal to actuate the vehicle brakes. In general, the "percent clearance" value remaining after brake actuation is preferably depicted by the indicating system. For example, if a given reference distance is initially measured between the bottom of the brake pedal and the floor board, and after depression the bottom of the brake pedal is only one quarter the reference distance from the floor board, then the clearance is 25 percent of the reference or initial clearance. It will become evident in the subsequent explanation that the indicating system can also indicate a "percent movement" value, so that for the previously described conditions, when a pedal is depressed through three-quarters of the reference distance between its initial position and the floor board, the 25 percent clearance value can also be portrayed as a 75 percent movement value.

To provide a workable determination of the conditions of the brake operating system in an automobile, it is requisite to produce some indication of the clearance remaining after the brake pedal has been depressed. In the past, service in general has depended upon the location of a spacing block adjacent the floor board of the auto, and then noting whether the brake pedal engages the block after the brake pedal is depressed. Manifestly such arrangement is inadequate to provide a reliable indication for all vehicles for the reason, among others, that the free pedal heights (or initial clearance values) of different cars vary widely, over a range of approximately three inches to nine inches. Accordingly, whether the pedal engages the spacing block after displacement supplies little usable information concerning the brake system.

It is therefore a primary object of the present invention to provide a ratio indicator system affording an accurate indication of the percent movement required to actuate the brakes or the percent clearance remaining after actuation of the brakes, thereby to afford a reliable indication of brake system condition by means of a quick pedal depression test.

It is a more particular object of the invention to provide such a system which is easily inserted between the brake pedal and the floor board, readily adjustable to constitute the initial clearance as 100 percent clearance, and having indicating means thereon to positively and quickly indicate the final percent clearance.

The foregoing and other objects are realized by providing a ratio indicator including a pair of relatively movable members, one of which is engageable with a movable element such as the brake pedal, and the other of which is engageable with a fixed element such as the floor board. Indicating means, such as a helical spring or an electrical meter, is provided in operative association with the members, and an adjusting means is also provided to cooperate with the indicating means in the establishment of a reference value correlated to the initial clearance between the relatively fixed and movable elements, i.e., the brake pedal and the floor. Also provided is index means for cooperating with the indicating means so that, upon movement of one member relative to the other, an indication is provided which depicts the percentage the remaining clearance bears to the reference or initial clearance. If desired, frictional means can be provided to engage and retain the members in the positions to which they are moved by the brake pedal displacement.

In order to acquaint those skilled in the art with the best modes contemplated by me for making and using the invention, a description of preferred embodiments is set forth in connection with the accompanying drawings, wherein like reference numerals identify like elements, and in which:

FIGURES 1 and 2 are front views depicting a first embodiment of the invention before and after displacement of the brake pedal;

FIGURE 3 is a front view, partly in section, of another embodiment of the invention;

FIGURE 4 is a front view, partly in section, of a preferred embodiment of the invention; and FIGURE 5 is a schematic diagram illustrating the interconnection and operation of certain of the components depicted generally in FIGURE 4.

As shown in FIGURE 1, the floor board 10 of an automotive vehicle is usually separated from the bottom surface of the brake pedal 12 by an initial or reference clearance distance designated by numeral 13. This distance is the reference value against which the ultimate position of the brake pedal will be compared, to provide a ratio indicating the operative condition of the braking system of the automobile.

The embodiment of FIGURE 1 comprises an elongated rod member 15 rounded at its lower end to facilitate its ready insertion in and removal from a position where it abuts floor board 10 beneath or adjacent the brake pedal 12. A knurled cap 18 is affixed to the upper end of rod member 15 by a pin 19 or other fastening element to provide a handle or hand grip therefor.

A hollow cylinder or tube is slidably or telescopically mounted on the rod, and is provided at its lower end with an angle or foot 20. Foot 20 includes a horizontally extending portion 22, the extremity of which is provided with a tapped hole into which an adjusting screw 23 is threaded. The upper tapered portion of screw 23 is adapted to engage the lower surface of the brake pedal, and to accommodate clearance between the pedal and the foot to insure accurate measurement.

Adjacent its upper end, the tube 16 mounts an indicating means 24 which in the embodiment of FIGURE 1 comprises a helical spring constrained between an upper stop or handle assembly 25 and a lower adjustable stop assembly 26. Handle assembly 25 includes a central bore portion 27 fitted over the end of tube 16, and affixed to the tube by a fastening pin 28. A horizontal arm portion 29 extends from assembly 25 to facilitate grasping of the ratio indicator. A first thumb screw 30 is provided, and dimensioned to pass through aligned tapped apertures in portion 27 of the upper stop assembly and tube 16, so that extremity 31 of thumb screw 30 is adapted to be engaged with and disengaged from the rod 15. Extremity 31 is preferably provided with a tip of friction material, such as rawhide, to provide for frictional engagement between the rod 15 and the tube 16 thereby to accommodate intended relative movement, but to preclude inadvertant displacement between these members.

The uppermost coil of spring 24 abuts the lowermost portion of the stop assembly 25, and the lowermost coil of the spring abuts the upper surface of the lower movable stop assembly 26. The latter includes a collar 34 slidable on the tube 16 and a set screw 35, the extremity of which abuts the periphery of tube 16 to facilitate locking of collar 34 at any desired point on tube 16. Thus, by suitable adjustment of collar 34, the spring may be preset to any desired degree of expansion or contraction, i.e., any desired length.

In order to clearly and rapidly portray the percent clearance, indicia such as numbered indicator tabs 36 are affixed to the coils of spring 24. By employing a spring formed of ten coils with a uniform spiral configuration and a uniform stiffness or compression factor, it is manifest that the ten coils and indicator tabs will be uniformly spaced at any given compression or expansion of spring 24 so that each indicates 10 percent of the adjusted length of the spring. To provide an indication of the basic reference point of the device, an index or gauge mark 37 is scribed, embossed, or otherwise formed on rod member 15 so as to be visible through a slot 38 formed in the upper portion of tube 16 within the convolutions of the spring.

In use, the device is grasped by the handles 18 and 29 and positioned so that the lower end of rod 15 abuts the floor board 10 beneath the brake pedal 12. The tube 16 is then manipulated by handle 29 to position the portion 22 of foot 20 beneath the brake pedal and the tube is then moved upwardly until screws 23 engages the lower surface of the brake pedal. Thumb screw 30 is then tightened so that the rawhide tip 31 thereof engages rod 15 with sufficient frictional force to prevent inadvertent movement of the tube relative to the rod. The lower adjustable stop assembly 26 is thereafter adjusted by moving the collar 34 upwardly or downwardly until the lowermost coil of spring 24 is positioned at the gauge or reference mark 37, as illustrated in FIGURE 1. Thumb screw 35 is tightened to secure collar 34 in adjusted position on tube 16. The interval or space then defined by spring 24 between its uppermost and lowermost coils is now equal to the reference distance 13 defined between the lower surface of the brake pedal and the floor board of the automobile, and the total length of the spring is indicated as 100 percent by the alignment of the lower tab 36 (bearing numeral 10) with the reference mark 37.

While grasping knurled collar 18 to steady the ratio indicator, brake pedal 12 is now firmly depressed in a conventional brake-actuating movement to the bottom limit accommodated by the brake system. For purposes of explanation, it is assumed that the brake pedal is displaced from an initial position, shown in solid lines in FIGURE 1 and in broken lines in FIGURE 2, to a final position represented by solid lines in FIGURE 2, the displacement being referenced by numeral 40. Such displacement of the brake pedal necessarily effects downward displacement of foot portion 20 and thus of tube member 16. The position of rod member 15 does not change, but tube 16, spring 24, and upper and lower stop members 25 and 26, are all displaced downwardly as a unit through the same distance as the brake pedal, i.e., displacement 40. With such displacement of indicating means 24, gauge mark 37 now is disposed at a different position relative to the coils and the indicating tabs 36 on spring 24. In the position indicated in FIGURE 2, with gauge mark 37 approximately 40 percent of the distance between the spring coils bearing tabs numbered 7 and 8, a clearance of 74 percent is indicated. That is, the distance between the bottom of the brake pedal and the floor board after pedal displacement is 74 percent of the reference or initial distance between the bottom of the brake pedal and the floor board before pedal displacement. This generally would indicate that the brake system is in close to excellent condition.

It will be apparent that if the actual displacement or movement of the pedal were desired, rather than the remaining clearance, the numerical order of indicating tabs 36 could readily be reversed, starting with tab 10 at the uppermost coil and tab 1 at the lowermost coil of spring 24. With such change, the device, after movement through distance 40, would depict movement of 26 percent, rather than a clearance of 74 percent.

In the embodiment of FIGURE 3, the rod and tube arrangement has been modified to include a double rack and pinion construction to facilitate location of the indicator adjusting collar 34 at the upper end of the device and an indicator reading from bottom to top. In this embodiment, tube member 16 has been replaced by a composite assembly including a lower portion 45 affixed to an upper portion 55 generally conforming to tube 16. Lower portion 45 is an enlarged cylinder providing journal supports (not shown) for a shaft 46 on which a pinion gear 47 is mounted for free rotation. A first rack member 48 is positioned to slide within a channel in the interior of portion 45 as the teeth of rack 48 successively engage the teeth of pinion 47. Member 48 includes a downwardly extending portion 49 adapted at its lower end to engage floor board 10. A second rack member 51 is similarly guided within member 45 as the teeth of rack 51 engage pinion 47. The upper portion of rack 51 defines a rod 52, corresponding to rod 15, which extends through the tube 55 and to which knurled cap 18 is affixed. Together rack members 48 and 51 supplant rod member 15 of the embodiment shown in FIGURES 1 and 2.

In FIGURE 3, an angle member 53 is affixed to the lowermost part of cylinder 45. Angle 53 has a horizontal portion which supports set screw 23. The remaining portions of the ratio indicator are substantially the same as previously described, with the exception that the lowermost part of spring 24 is constrained against the upper surface of portion 45, and collar 34 and set screw 35 are positioned above the spring to afford the initial setting of clearance distance 13, representing the interval between the bottom of the brake pedal and the floor board. The remainder of the construction and operation of the embodiment of FIGURE 3 is manifest from a comparison with the previously described embodiment.

In the preferred embodiment of the invention, which is illustrated in FIGURE 4, an inner member or rod 60 is machined to define a rack 61 along a portion thereof, or a separate rack element can be affixed to rod 60. The rack meshes with a pinion 62 suitably journalled within a housing 63, which comprises an upper handle and indicating portion 66 and a lower tube portion 70 slidably mounted on the rod 60. In general, the rod 60 and the housing and tube assembly 66–70 correspond to the rod 15 and tube 16 previously described.

For the convenience of the user, a spring 75 preferably encircles the lower portion of rod 60 within the tube 70 between the housing 63 and a retaining collar 73 locked in place on the rod 60 normally to bias the rod downwardly from the housing and tube assembly to facilitate positioning of the rod and the foot 53 relative to the brake pedal. Spring 75 is not an indicating means in this embodiment, and can be omitted if it is desired to effect manual displacement of the handle and tube assembly relative to the rod.

Housing 63 mounts an upwardly exposed meter 65 for easy reading, and has a handle to permit the operator to grasp and steady the ratio indicator during operation. A range adjustment knob 67 is supported in the right wall of the housing, which wall also defines an aperture 68 to afford access to adjusting element 69, which is utilized for basic calibration of the electric circuit to be described.

Other components within the housing 62 include a variable impedance or potentiometer 76 having an adjustable tap movable by rotation of shaft 77, which is connected to pinion gear 62 for concomitant angular displacement therewith. One or more flashlight cells 78 provide the requisite electrical energy for operation of the circuit components shown, but those skilled in the art will recognize that any suitable energizing means can be used, including an arrangement for providing electrical energy to the ratio indicator responsive to the insertion of a conventional wall plug (not shown) into a receptacle of a commercial power main, or insertion of a suitable connector into the cigar lighter receptacle provided in most automobiles. A second potentiometer 79 is also provided and supported as shown, and the effective value of this potentiometer is determined by the angular setting of shaft 69. Range adjustment knob 67 is coupled over shaft 80 to regulate the effective resistance of another potentiometer 81 and to displace the operating components (not shown) of switch 82.

As shown in FIGURE 5, switch 82 includes a movable contact 83 and a fixed contact 84 for completing a circuit to pass energy from battery 78 over energizing means or conductors 85 and 86 to the other components in the circuit. Potentiometer 76 includes an adjustable connection 87 coupled to conductor 86, and the opposed end terminals of potentiometer 76 are coupled to the respective end terminals of potentiometer 79 and to the connectors or terminals of meter 65. Movable arm 88 of potentiometer 79 is coupled over a conductor 89 to one end terminal of potentiometer 81, which potentiometer includes movable arm 90 coupled to movable contact 83 of switch 82.

Considering the operation of the embodiment depicted in FIGURE 5, with the lower portion of rod 60 completely retracted within tube portion 70 of the handle and tube assembly, the position of movable arm 87 on potentiometer 76 is determined by the engagement of pinion gear 62 with rack portion 61 of the rod. The operator then utilizes a simple tool, such as a screwdriver, to rotate shaft 69 and effect displacement of movable arm 88 of potentiometer 79 until needle or index means 91 of meter 65 is exactly on the zero scale, or 0 percent clearance, indication.

The ratio indicator is then grasped by the handle portion 66 so that angle 53 extends under the brake pedal with the tip of adjusting screw 23 contacting the lower surface of the pedal. Knurled knob 64 is rotated to release the frictional engagement of the handle and tube assembly with rod 60, permitting the compressed spring 75 to drive rod 60 downwardly until the lower tip of rod 60 engages the floor board of the car. As the rod moves downwardly, rack portion 61 drives pinion gear 62 and effects displacement of shaft 77 on potentiometer 76, effecting a like displacement in an electrical sense of movable connection 87 of this potentiometer. The operator now adjusts the range by rotating knob 67 and shaft 80 of potentiometer 81 until needle 91 on the meter comes to rest exactly on the full scale, or 100 percent clearance, indication. Thus it is apparent that range adjustment potentiometer 81 represents an adjusting means analogous to the adjustable collar assembly 34, 35 of the previous embodiments, and is utilized to establish the initial base or reference value representing the clearance between the bottom of the brake pedal and the floor board before actuation of the brake pedal.

The operator then depresses the brake pedal in a conventional actuating motion, driving angle 53 and the handle and tube assembly 66–70 downwardly until motion of the brake pedal halts. This downward movement effects angular displacement of pinion gear 62 as it is rotated by engagement with rack 61, causing a displacement of movable connection 87 on potentiometer 76 which provides an unbalanced condition in the previously balanced bridge circuit including potentiometers 76 and 79. This unbalance is indicated on meter 65 as a counter-clockwise rotation of index means 91 to a final position as indicated in broken lines, directly indicating the percent clearance remaining between the bottom of the brake pedal and the floor board after the brake pedal has been depressed. It is noted that the provision of a sensitive electrical meter, such as a milliammeter, with an easily read scale provides an accurate indication of the exact clearance (or the percent movement, if desired) after the brake pedal is depressed.

The invention is thus seen to provide an accurate and economical means for rapidly determining the percent clearance between the brake pedal and the floor of the car after actuation of the brakes. If a brake pedal has only 50 percent of its initial space remaining after depression of same, it is obvious that 50 percent of this space is required for brake actuation. A pedal with 100 percent clearance after depression would indicate that the brakes were adjusted too tightly with the possibility of freezing. If a pedal has only 25% clearance after depression of same, the indication is that servicing is definitely needed. This may require relining, readjusting, and addition of brake fluid, or overhaul of the master brake cylinder or wheel cylinders or both. A reasonable schedule of acceptability, based on surveys of vehicles on the road, indicates the following to be a useful criterion in using the device which measures percent of pedal-to-floor clearance:

| Percent pedal clearance: | Rating |
| --- | --- |
| 0–25 | Danger. |
| 25–49 | Poor. |
| 50–74 | Satisfactory. |
| 74–90 | Excellent. |
| 91–100 | Dragging brakes. |

Manifestly, such an acceptability schedule is of negligible utility with prior methods in which only the ultimate position of the brake pedal relative to a spacing block has been noted. In distinction to such methods, the present invention provides a simple and inexpensive system for rapidly and accurately portraying the exact clearance between the brake pedal and the floor of the car to correspondingly indicate the rating of the braking system.

While only particular embodiments of the invention have been described and illustrated, it is apparent that modifications and alterations may be made therein. Also, application of the invention to determinations other than the testing of brakes will be obvious to those skilled in arts involving relative movement of two components. Accordingly, it is to be appreciated that various changes, rearrangements and modifications may be made in the illustrated device without departing from the scope of the invention, as defined by the appended claims.

What is claimed is:

1. A ratio indicator for visually depicting the displacement of a first element relative to a second element, comprising, a pair of relatively movable members respectively associable with the elements, adjustable indicating means operatively associated with said members for indicating the initial distance between said elements as a base value, index means controlled by said members for cooperation with said indicating means responsive to relative displacement of said elements to indicate the extent of such relative displacement as compared to said base value, and means for retaining said members in their relative positions after said relative displacement is terminated.

2. A ratio indicator for visually depicting displacement of a pair of relatively movable elements, comprising a rod member, a tube member positioned on said rod member for movement relative to said rod member, indicating means including a spring disposed about said tube member, index means on said rod member adjacent said spring, and adjustable collar means on said tube member cooperating with said spring for adjusting the length of said spring relative to said index means to cause the spring to depict the initial distance between said elements as a base value, relative movement of said elements effecting a corresponding relative movement of said rod and tube members to correspondingly displace said index means with respect to said spring, whereby the extent of relative movement is compared to said base value by the final position of the index means relative to the spring.

3. A percent movement indicator for visually depicting displacement of a brake pedal relative to a vehicle floor, comprising a rod member adapted to engage the car floor and having a gauge mark thereon, a tube member slidably mounted on said rod member having a foot portion at one end thereof adapted to engage the lower surface of the brake pedal and a longitudinal slot therein exposing said gauge mark, helical spring means encircling said tube member about said slot, and adjustable collar means on said tube engageable with said spring to align one end of said spring with said gauge mark to depict the initial distance between the brake pedal and the floor as a base value, movement of said pedal toward the floor effecting a corresponding relative movement of said rod and tube members to correspondingly displace said spring with respect to said gauge mark, whereby the extent of relative movement in compared to said base value by the final position of the gauge mark relative to convolutions of the spring.

4. A percent movement indicator as set forth in claim 3, including retaining screw means extending through said tube member and having a friction tip engaging said rod member with a frictional force sufficient to obviate inadvertent movement, but accommodate intended movement, of the tube member relative to the rod member.

5. A device for visually depicting the degree of displacement between a pair of relatively movable elements, comprising a tube member having opposed channels on interior surfaces thereof, a pinion gear supported for rotation between the channels and a portion at the lower end thereof engageable with one of said elements, a rod assembly including a first rack positioned in one of said channels in engagement with said pinion gear and having a lower end portion engageable with the other of said elements, and a second rack disposed in the other of said channels in engagement with said pinion and extending upwardly therefrom, indicating means including a helical spring encircling said tube member about the upper end portion of said second rack, index means on the upper portion of said second rack cooperable with the convolutions of said spring, and adjustable collar means on the upper portion of said tube member cooperating with said spring to correlate the upper end of the spring with said index means to depict the initial distance between said elements as a base value, relative movement of said elements effecting a corresponding relative movement of said rod assembly and tube member to correspondingly displace said spring relative to said index means, whereby the extent of relative movement is compared to said base value by the final position of the index means relative to the spring.

6. A device for visually depicting the degree of displacement between a pair of relatively movable elements, comprising a rod member engageable with one element, a handle and tube assembly slidably receiving said rod member and engageable with the other element, indicating means including an electrical meter disposed in said handle and tube assembly, circuit means including adjustable impedance means coupled to said meter for adjustment to depict the initial distance between said elements as a base value, relative movement of said elements effecting corresponding relative movement of said rod member and said handle and tube assembly, second variable impedance means in said housing coupled to said meter, and means on said rod actuating said second impedance means upon relative movement of said member and assembly, whereby the extent of relative movement is compared to said base value directly on the electrical meter.

7. A percent clearance indicator for visually depicting displacement of a brake pedal relative to a vehicle floor, comprising a rod member engageable with the floor and having a rack element along a portion thereof, a handle and tube assembly slidably receiving said rod member and being engageable with the lower surface of the brake pedal, an electrical meter including a pointer disposed in the handle portion of said assembly, electrical circuit means including first adjustable impedance means coupled to said meter for adjustment to depict on the meter the initial distance between pedal and floor as a reference value, second adjustable impedance in said circuit, and means including a pinion in said assembly engaged with said rack and connected to said second impedance means for regulating the effective value of said impedance upon relative movement of said rod member and said handle and tube assembly, whereby the extent of relative movement is compared to said reference value by the final position of the pointer on the electrical meter.

8. A percent clearance indicator as set forth in claim 7, including third adjustable impedance means coupled in said electrical circuit for basic calibration of said meter.

9. A percent clearance indicator as set forth in claim 7, including means for frictionally retaining said rod member and handle and tube assembly against inadvertent movement, but accommodating intended relative movement therebetween.

10. A percent clearance indicator comprising a pair of relatively movable members engageable respectively with a movable element and a reference, adjustable indicating means operatively associated with said members for indicating the normal clearance between the element and the reference as 100 percent clearance, and means on one of said members cooperable with said indicating means moved relative to the other member upon relative movement of the element and the reference to indicate on said indicating means the percentage the then remaining clearance bears to the normal clearance, and means frictionally retaining said members in the relative positions to which moved by the element.

References Cited by the Examiner
UNITED STATES PATENTS

| | | | |
|---|---|---|---|
| 1,901,292 | 3/1933 | Graham | 33—169 |
| 1,942,118 | 1/1934 | Pignone | 33—169 |
| 2,461,425 | 2/1949 | Kelly | 340—177 |
| 2,463,681 | 3/1949 | De Giers et al. | 340—177 |
| 3,011,262 | 12/1961 | Allen et al. | 33—149 |

ISAAC LISANN, *Primary Examiner.*